Oct. 4, 1932. W. A. CHILSON 1,880,802
ELECTRICAL MICROMETER FOR CONTINUOUSLY GAUGING THE
THICKNESS OF MOVING NONMAGNETIC MATERIAL
Filed July 24, 1930 2 Sheets-Sheet 1
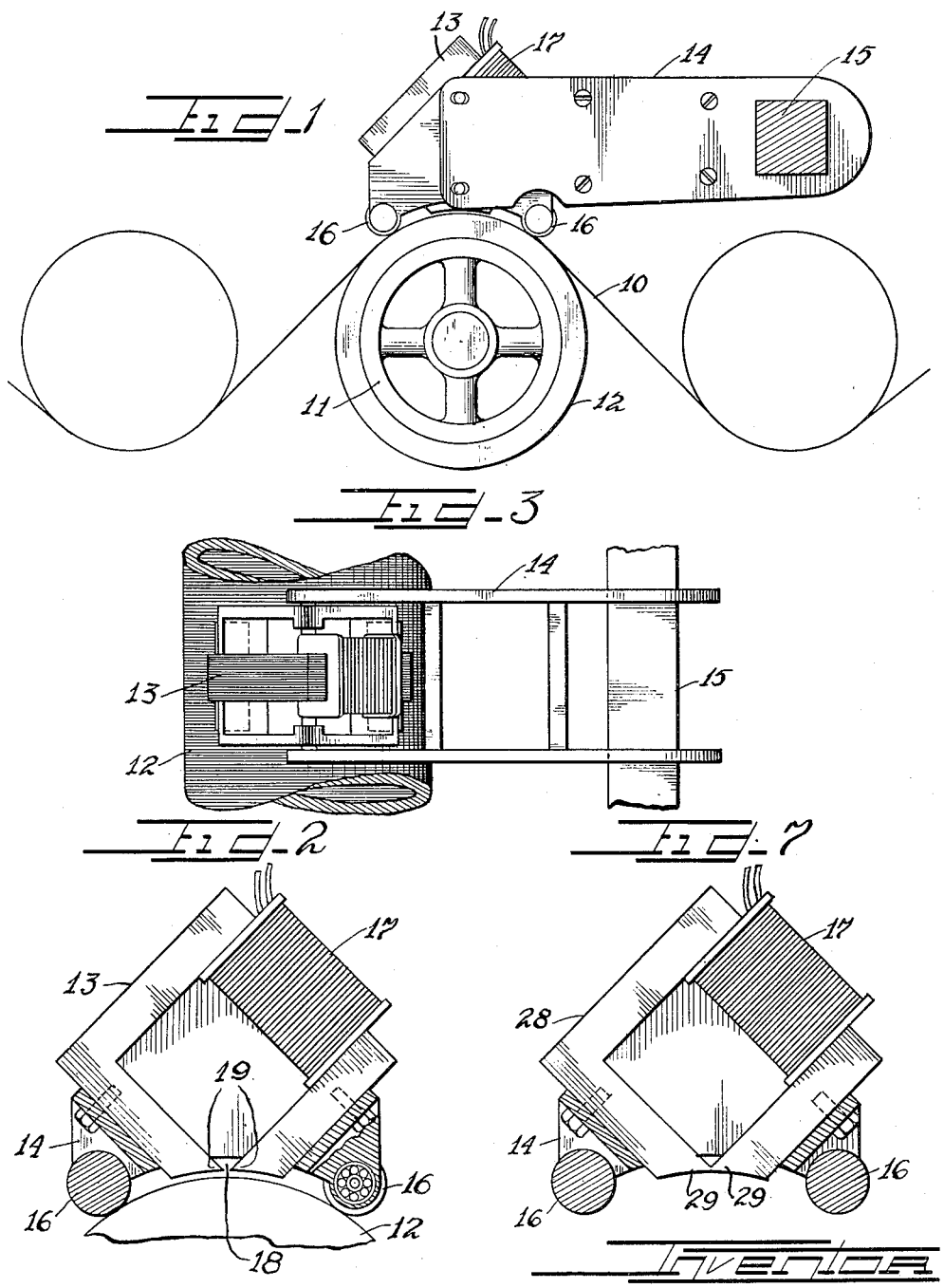

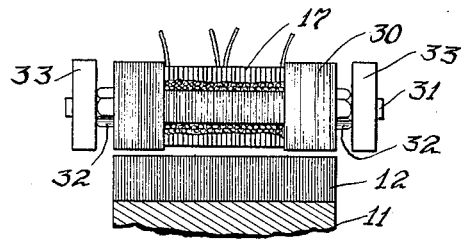
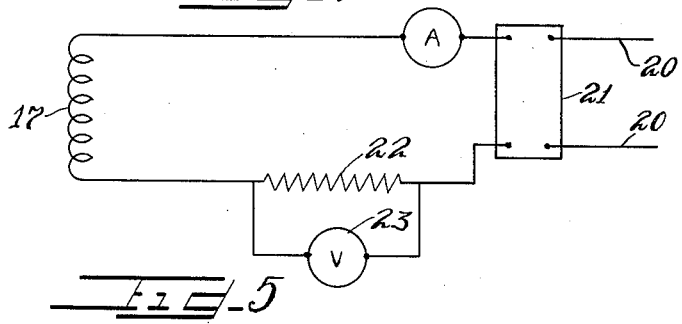
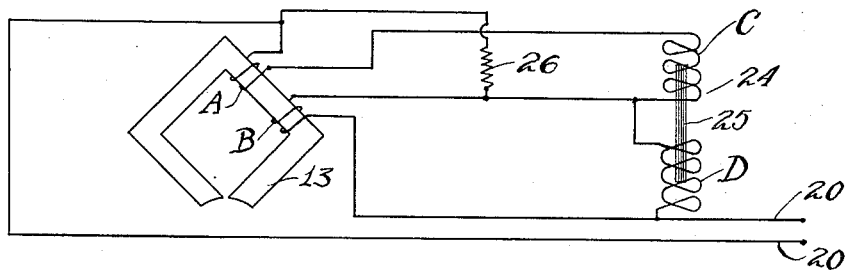
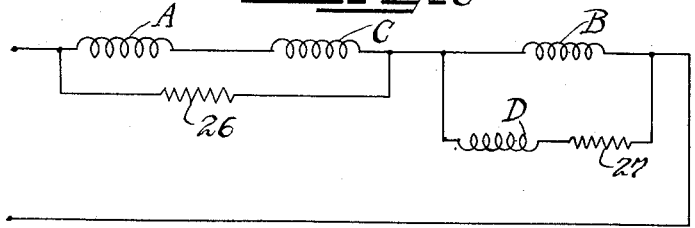

Patented Oct. 4, 1932

1,880,802

UNITED STATES PATENT OFFICE

WARREN A. CHILSON, OF WAUSAU, WISCONSIN

ELECTRICAL MICROMETER FOR CONTINUOUSLY GAUGING THE THICKNESS OF MOVING NONMAGNETIC MATERIAL

Application filed July 24, 1930. Serial No. 470,499.

This invention relates to the method of and the means for continuously gauging the thickness of a moving strip of paper, or the like, while it is being made or processed.

It is an object of my invention to provide an electrical micrometer for measuring and recording continuously the thickness of paper, board, or other non-magnetic substances as they are being made or processed.

I accomplish the object of my invention by varying the character of a magnetic field in response to variations in the thickness of a moving strip of paper, or the like, under measurement and providing an instrument which is sensitive to the varying magnetic field to indicate and record the thickness of the material measured.

A further object of my invention is to provide a suitable system of electrical connections and apparatus for accomplishing the object stated above.

My invention will be best understood by reference to the accompanying drawings, in which I have shown preferred embodiments thereof and which will be described later.

I desire to have it understood, however, that various changes can be made in the construction and arrangement of parts without departing from the spirit and scope of my invention.

In the drawings:

Figure 1 is an end view, in elevation, of my device assembled for use in gauging paper, and with parts in cross-section.

Figure 2 is an end view, in elevation, of my magnet structure, with parts in cross-section.

Figure 3 is a top view of the assembly shown in Figure 1, and with parts shown broken and in cross-section.

Figure 4 is a diagrammatic view of an electrical circuit and apparatus arrangement employed in the use of my device.

Figure 5 is a diagrammatic view of an electrical circuit and apparatus arrangement employed in the use of my device.

Figure 6 is a diagrammatic view of an electric circuit arrangement substantially similar to that shown in Figure 5, with the elements thereof shown in more convenient form.

Figure 7 is an end view, in elevation, of a modified form of magnet structure, with parts in section.

Figure 8 is a front view, in elevation, of a modified form of magnet structure, with parts in cross-section.

In the drawings, the numeral 10 indicates a strip of paper or the like, which is continuously passed during manufacture over a revolving roll 11 having a peripheral portion or rim 12 of laminated magnetic material. Similar numerals indicate similar elements.

A magnet core 13 of laminated material is positioned over the rim 12, and is held in a suitable carrier 14, of non-magnetic material, secured on a rotatable shaft 15, so that the magnet core is capable of vertical movement with respect to the rim 12. Rotatable members 16, are mounted on the carrier 14, and these rotatable members are arranged to ride on the moving paper 10, and to maintain the under surface of the core 13 a suitable distance above the moving paper.

The magnet core 13 is formed of laminations of magnetic material, and a coil 17 is positioned thereon for energizing it when the coil is connected to a source of alternating current.

The laminations of the core may be of substantially square punchings, as shown in Figure 1, with one corner of the square ground to provide a surface of the core complementary to that of the rim 12, and so as to leave a small air-gap 18, of about $\frac{1}{32}$ of an inch, between narrow tips 19, of the adjacent limbs of the core.

From an inspection of Figure 2 it will be seen that there are two terminal paths in parallel for the magnetic flux, namely, by way of the air-gap 18 between the narrow tips and by way of the relatively large terminal surfaces of the limbs and the adjacent surface of the rim 12.

It will be evident that variations in the thickness of the paper 10 will occasion vertical movement of the magnet core 13, and will cause variations in the reluctance of the path of the flux threading the rim 12, and vary the shunting effect of the rim 12 with respect to the flux path through the air-gap 18.

It is well understood that with an increase in the air-gap between the magnet core 13 and the rim 12, an increase in the reluctance of the flux path, will be accompanied by a decrease in the inductance and reactance of the coil 17, and vice-versa.

In Figure 4 I have shown an instrument and circuit arrangement by means of which the thickness of the paper may be indicated because the reactance of the coil 17 is a function of the thickness of the paper and of the flux intensity of the magnetic path through which the paper passes. The coil 17 is shown connected to alternating current supply lines 20, through a suitable conventional device 21 for maintaining the terminal voltage substantially constant, and in series with a suitable resistor 22.

It will be evident that when the paper 10 is thickest, and the space between the rim 12 and the core limbs 19 is greatest, the reactance of the coil 17 will be least, and, therefore, of the total voltage impressed on the circuit the reactive component will be least and the power component across the resistor will be greatest. When the paper is thinnest, the reactive component of the impressed voltage will be greatest, and the power component across the resistor will be least. A voltage indicating instrument 23 is connected across the ends of the resistor 22, and its scale may be suitably calibrated to indicate the thickness of the paper 10. An ammeter may also be inserted in the coil circuit to indicate the changes in the magnetizing current due to the changes in the thickness of the paper 10.

Figures 5 and 6 show diagrammatically a circuit arrangement of instruments so that fluctuations of the alternating current supply voltage do not impair the sensitivity or reliability of the means employed to indicate a change in the thickness of the moving paper.

The exciting coil 17 of the magnet core 13 is replaced by two coils A and B having similar electrical characteristics, or by a single coil of two similar parts. An indicating device 24, having two similar coils C and D, so arranged that when they carry equal currents a movable iron core 25 will be equally and oppositely affected by them and extend equally into their bores, is connected to the exciting coils A and B as shown. A resistor 26 is connected in parallel with the coils A and C.

It will be evident that if the magnetic flux in the magnet core 13 is increased the reactance of coils A and B will also increase, but since the resistor 26 is independent of flux changes relatively more current will flow through the path including the resistor 26 and the coil D than through the path including the coil C. The increased current through coil D causes it to pull the core 25 far enough into it to increase its reactance so that the impedance of the branch including coils D and B will equal that of the other branch of the circuit when the core 25 comes to rest. On the other hand, when the magnetic flux in the core 13 is decreased, the movable core 25 will be drawn into coil C to balance the impedances of the branches of the circuit.

It will be evident that the usual fluctuations of the voltage of a lighting circuit will not disturb the balanced condition of the core 25 in the coils C and D, and will not impair the sensitivity of the circuit arrangement.

If working convenience indicates that the coils A and B should be arranged so that their reactance may vary between a very low value and 50 ohms with changes in the flux paths of the magnetic structure with variations in the thickness of the material being gauged, then the movable core 25 and the coils C and D should be so arranged that the reactance of the coils C and D will vary through the same range of reactance values, and the fixed resistor 26 should have a resistance of 50 ohms. However, when the working changes in the thickness of the material being gauged are such that the reactance of the coils A and B varies from 25 to 50 ohms it is advantageous to insert an additional resistor 27 having a resistance of 25 ohms in series with coil D, as shown in Figure 6. Figure 6 shows in convenient form the circuit arrangement of Figure 5 and differs therefrom only in showing the resistor 27 as already mentioned.

While in the instrument 24 I have shown a device responsive to the unbalancing of the impedances of the circuit due to changes in the thickness of the material being gauged, it will be obvious that other means may be employed within the scope and the spirit of my invention.

Figure 7 shows a modified form of the core structure. The magnet core 28 is formed of laminated magnetic material but instead of having an air-gap, as in the structure shown in Figure 2, the core tips are integrally connected, or connected by a narrow bridge or shunt of suitable magnetic material. The tip-connecting bridge or shunt will obviously become saturated with magnetism so that the reluctance of the bridge or shunt will not be much lower than that of the small air-gap of the core shown in Figure 2, and when employed in the manner described in connection with the core of Figure 2 will operate in substantially the same way.

In Figure 8 I have shown a modified form of the core structure. The core 30 comprises laminations of magnetic material assembled on a shaft 31 to form a drum revolvable with the shaft. The laminations are secured to the shaft by any suitable means, as for instance, by clamping nuts 32 threaded on the shaft 31. The laminations are so arranged that a magnetizing coil 17 may be suitably mounted on the core structure intermediate the ends thereof. The coil may be arranged stationary with the intermediate portion of the core revolvable therein, or it may be arranged to revolve with the core and have its terminal suitably connected to slip-rings, as convenience may dictate.

The shaft 31 is suitably mounted for rotation in bearings 33, which may be mounted in a carrier of the type shown in Figures 1 and 2 so that the revolvable core structure is mounted to revolve on the paper 10, and for vertical movement as the thickness of the paper varies.

The coil 17 is connected to the alternating current supply lines 20 in the circuit arrangement already described in connection with the core structure shown in Figure 2.

While I have shown and described my preferred embodiment of my invention in its application to the gauging of a strip of paper, or the like, it will be understood that my invention is also applicable to the gauging of other materials than paper, and to the gauging of magnetic materials.

Convenience may dictate certain changes in the magnetic structure, and in the circuit arrangements shown. The magnetic structure may be of solid materials instead of being of laminated material, as shown, with a probable increase in the iron losses, however, and a somewhat decreased sensitivity.

Instead of connecting the voltmeter 23 across the resistor 22, as shown in Figure 4, I may connect it across the coil 17 to indicate the reactive component of the total voltage. Instead of connecting the coils C and D of the indicating instrument 24, Figures 5 and 6, directly in the circuit of the coils A and B, I may insert a pair of transformers in the circuit so that the coils C and D, connected to the secondaries of the transformers, are isolated from metallic conductive association with the power supply lines 20. The primaries of the transformers would obviously be connected in circuit association with coils A and B in the manner in which the coils C and D are now shown.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. Means for continuously gauging the thickness of a moving strip of non-magnetic material, the said means including a magnetic member supporting the moving strip, and a magnet core revolvable on the said strip.

2. Means for continuously gauging the thickness of a moving strip, said means comprising a magnetic member adapted to support the strip, a magnet core revolvable on the strip, a coil on the core for connection to an alternating current supply, and indicator means in circuit connection with said coil.

3. Means for gauging the thickness of a piece of material, said means comprising a magnetic structure having opposed separable members adapted to receive the piece of material between them, a pair of coils on said magnetic structure, another pair of coils in opposed magnetic relation to each other, one of said another pair of coils being connected in series with one of said first named coils, an impedance connected shunting the group of two coils so formed, the other of said another pair of coils being connected in parallel with the other coil of said first named pair of coils to form a second group of coils, said second group of coils being connected in series with said first named group for connection to an alternating current supply system, and an indicator comprising a member movable by said another pair of coils to balance the impedances of said groups responsive to variations in the thickness of the material being gauged.

In testimony whereof I have hereunto subscribed my name at Rothschild, Marathon County, Wisconsin.

WARREN A. CHILSON.